Jan. 1, 1952 S. E. HILL 2,580,545
COMBINATION DRAWBAR AND SUPPORT
Filed Oct. 27, 1947 4 Sheets-Sheet 1
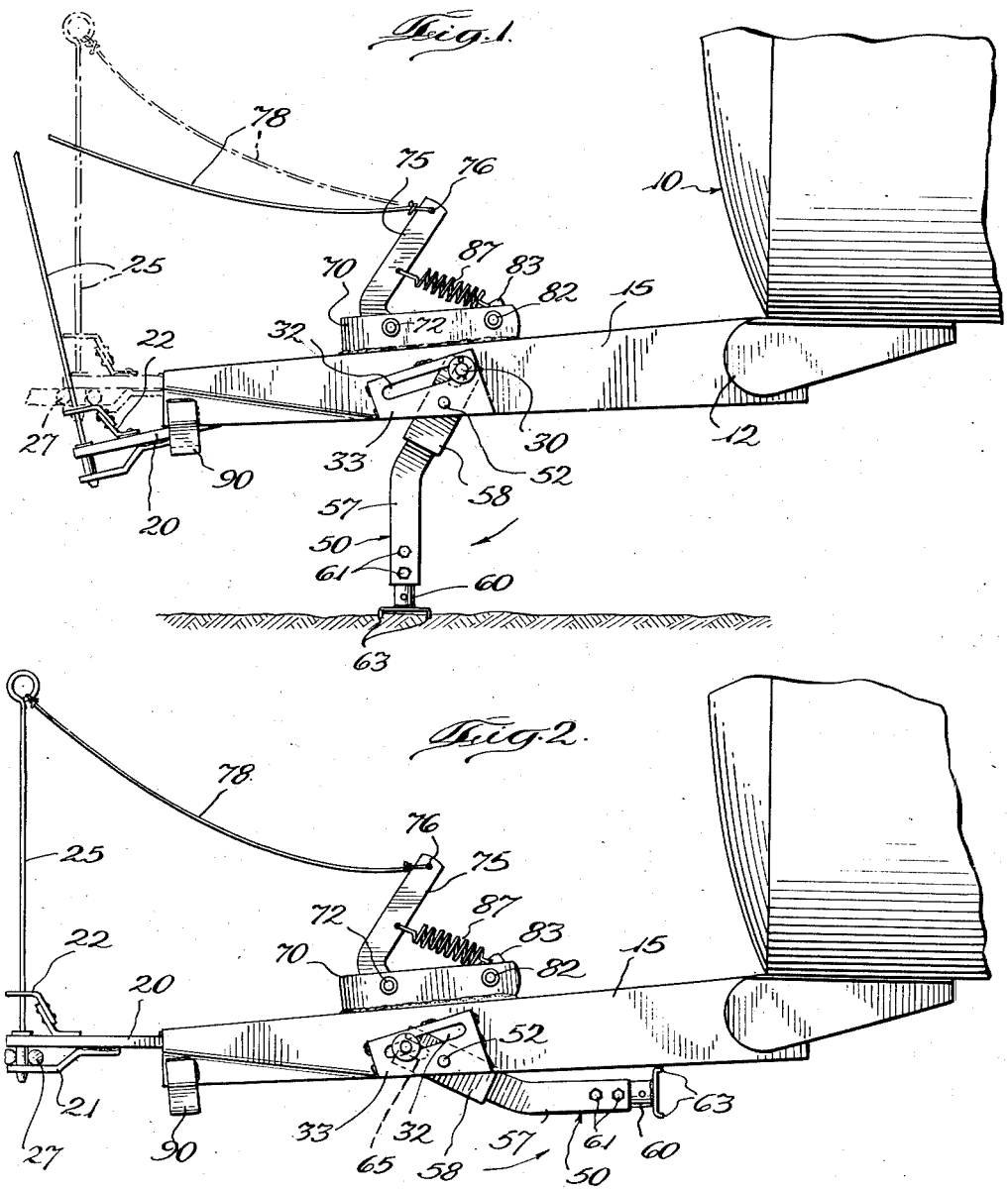

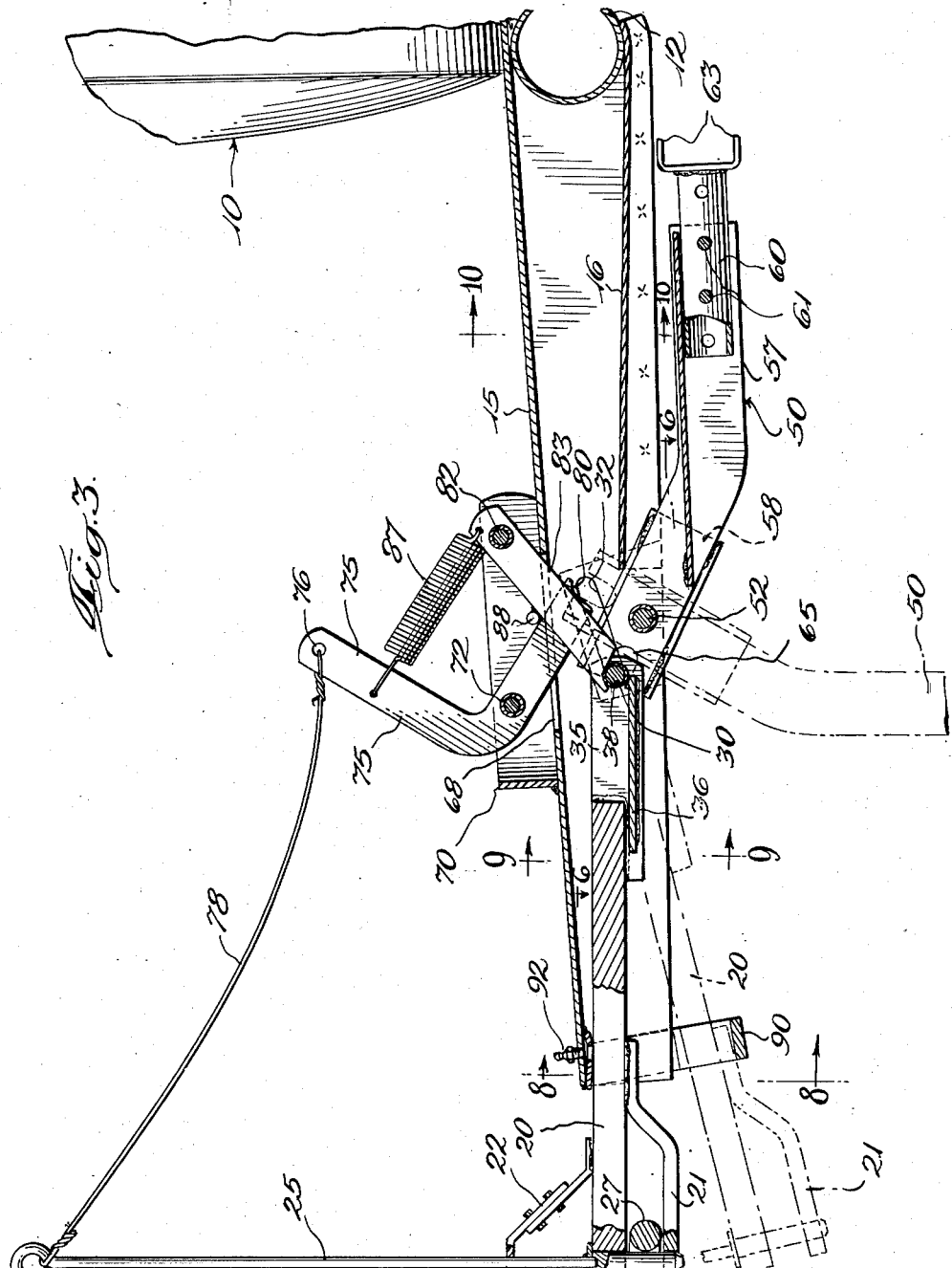

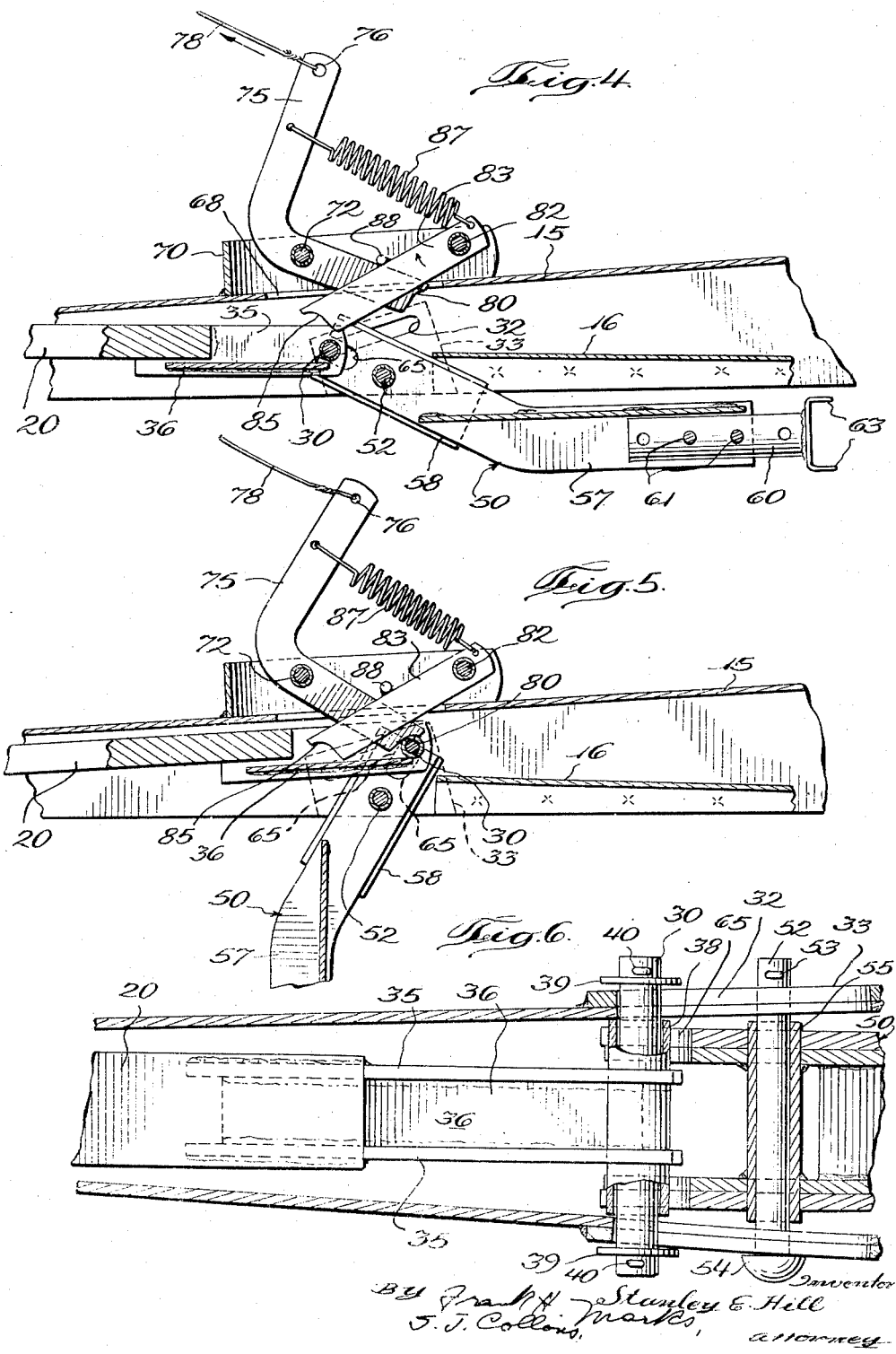

Jan. 1, 1952  S. E. HILL  2,580,545
COMBINATION DRAWBAR AND SUPPORT
Filed Oct. 27, 1947  4 Sheets-Sheet 4
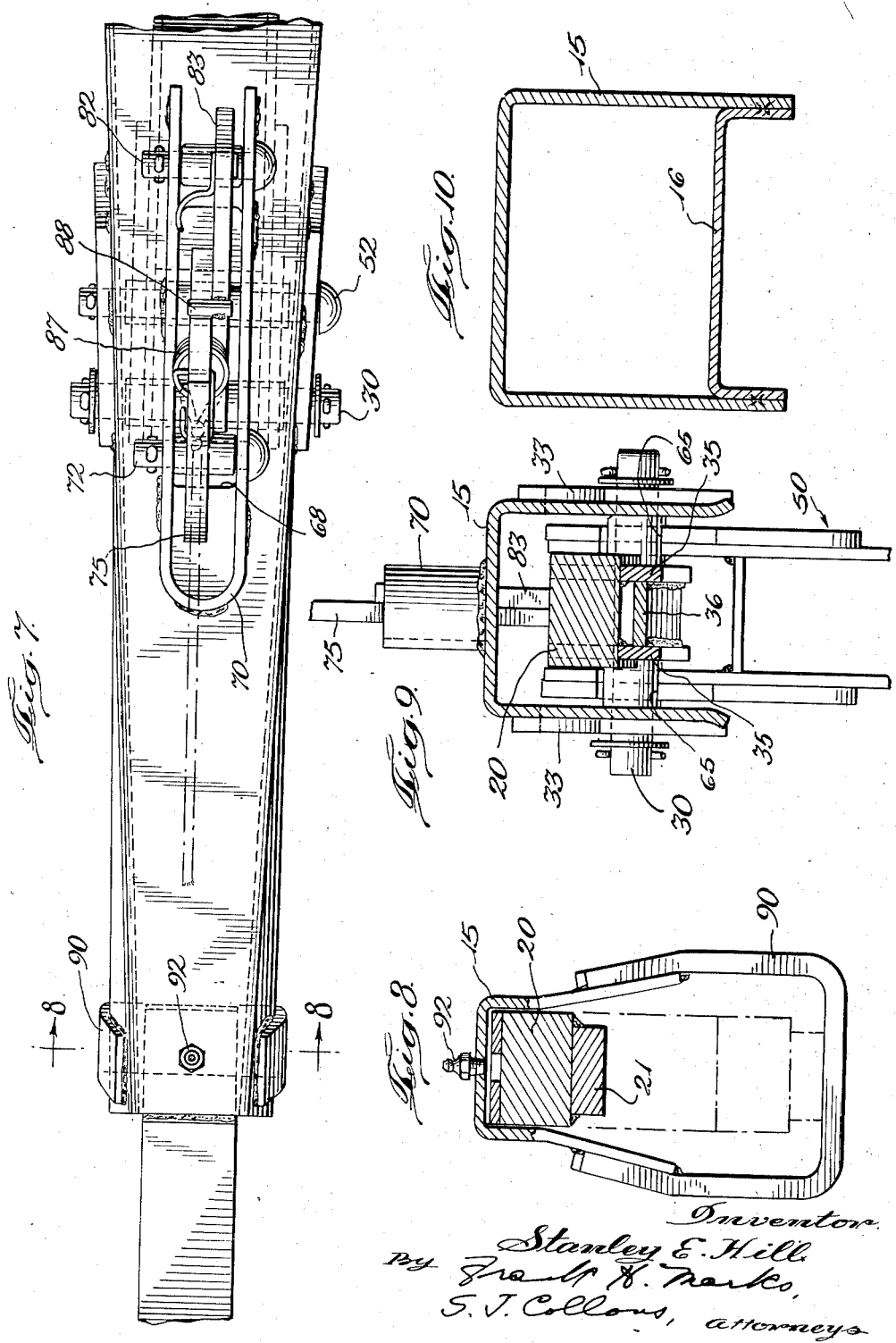

Patented Jan. 1, 1952

2,580,545

UNITED STATES PATENT OFFICE 2,580,545

COMBINATION DRAWBAR AND SUPPORT

Stanley E. Hill, Kankakee, Ill., assignor to Sears, Roebuck and Co., Chicago, Ill., a corporation of New York Application October 27, 1947, Serial No. 782,376

12 Claims. (Cl. 280—33.44)

My invention relates to a drawbar for a wagon, trailer or the like which is adapted to be drawn by a tractor or other suitable source of locomotion.

A particular object of my invention is to provide a device which will serve as a connector between a drawn vehicle and a source of motion, in the form of a tongue, drawbar or the like, said drawbar having a leg which is movable from a position where it will support the drawbar elevated in position convenient for coupling, as when the drawn vehicle is standing uncoupled, to a retracted or inoperative position. In combination with said elements I provide means whereby said support is automatically moved from one position to another by the forward or backward movement of the tractor.

I provide such a construction in simple, rugged design which, while inexpensive to fabricate, will withstand the roughest usage, as in connection with agricultural operations.

My invention will best be understood from a detailed consideration of the drawings wherein:

Fig. 1 is a side elevational view showing a drawbar and parts carried thereby embodying my invention, the supporting leg being shown in operative or supporting position;

Fig. 2 is a similar view but with the leg in inoperative or retracted position;

Fig. 3 is an enlarged detailed longitudinal section of the same, certain parts being shown in elevation, the leg shown retracted in full lines and extended in dotted lines;

Fig. 4 is a similar detailed view of the leg controlling elements in a different position from that shown in Fig. 3, the leg being shown retracted in this view;

Fig. 5 is a view similar to Fig. 4 but with the parts in the position taken when the leg is extended;

Fig. 6 is a fragmentary sectional view taken substantially on the line 6—6 of Fig. 3 on a still further enlarged scale;

Fig. 7 is a top plan view of the control portions of the drawbar;

Fig. 8 is a sectional view taken substantially on the line 8—8 of Fig. 7;

Fig. 9 is a sectional view taken substantially along the line 9—9 of Fig. 3, and Fig. 10 is a sectional view taken substantially along the line 10—10 of Fig. 3.

Numeral 10 represents in general a drawn vehicle, such as a wagon, manure spreader or other vehicle which is to be drawn by a tractor or other source of locomotion. Carried by tubular housing 12 or other suitable element on the vehicle 10 is a drawbar comprising a channel 15 which may be stiffened or reinforced by means of a channel 16 (Fig. 10) or other suitable element welded or otherwise secured to the open bottom of the channel.

Carried adjacent the free end of the channel 15 for limited relative longitudinal movement is a bar 20 having suitable hitching means on the forward end thereof. Such hitching means may comprise a perforated clevis 21 secured as by welding to the bar 20, the aperture of which is in vertical spaced alignment with a corresponding aperture in the bar 20 so as to receive a locking rod 25. A ring 27 or other suitable hitching element carried by the tractor is normally disposed between the bar 20 and the clevis 21 when the vehicle 10 is to be drawn. Another plate 22 on the opposite side of bar 20 has an aperture aligned with those of bar 20 and clevis 21 for keeping rod 25 in nearly vertical position.

A pair of plates, 35, 35 (Figs. 6 and 9) are welded to the end of the bar 20 and a transverse plate 36 is welded to the bottom edges of said plates 35, 35 and also to the bar 20. The plates 35 in combination with the plate 36 form a channel through which extends a journal-like sleeve 38 which receives a pintle 30. This pintle is provided with washers 39, 39 and is retained by means of cotter pins 40, 40 or the like, said pintle extending through diagonal slots 32 on each side wall of the channel 15. Reinforcing plates 33 similarly slotted may be welded or otherwise secured to each side wall of the channel.

A supporting leg 50 is pivotally mounted on the drawbar by means of a pintle 52 which extends through suitable apertures in the side walls of the channel 15, being retained by any suitable means as, for example, a cotter pin 53 at one end and a head 54 at the other. A journal 55 is welded to the leg to receive the pintle 52.

The leg 50 comprises an angular portion 57 welded or otherwise secured to a reinforcing plate 58 and has a foot 60 adjustable lengthwise of the leg by means of a spaced hole and a bolt 61. This foot is provided with earth penetrating flanges 63. The upper extremity of the plate 58 is slotted as indicated at 65 to engage the pintle 30 for a purpose which will soon appear.

The upper face of the channel 15 is apertured as at 68 and secured, as by welding, to this face of the channel so as to surround the aperture 68 is a flange or frame 70 open at one end. In the side walls of this frame 70 is a pintle 72 which serves as a pivot for an angular bar 75 serving as a bell crank lever controlling the position of the leg 50. The upper end of this lever is apertured as at 76 whereby a flexible member 78 such as a rope may be extended from the lever to rod 25. The opposite end of lever 75 is beveled to form a cam face 80, as seen best in Figs. 3, 4, and 5.

Also pivotally secured to the side walls of the frame 70 as on a pintle 82 is a latch bar 83, the lower end of the bar 83 likewise being beveled as at 85 to provide a cam surface engageable with pintle 30. A tension helical spring 87 extends between the bar 83 and the lever 75. A pin 88 is secured to the latch bar 83 extending therefrom transversely so as to lie in the path of bell crank 75 when the latter is rotated counter-clockwise.

Let us assume that the vehicle 10 is at rest, with the drawbar 15 supported by the leg 50, the parts being in the relative positions shown in Figs. 1 and 5 and as dotted in Fig. 3. A tractor or other suitable source of power is backed up toward the drawbar and engage therewith by the hitching rod 25. The tractor is then propelled forwardly and at the same time the operator will draw forwardly on the cord 78, moving the bell crank lever 75 in a counter-clockwise direction, as seen in the drawings. This will move the lever 75 from a position as shown in Fig. 5, wherein the cam face 80 is in engagement with the pintle 30, to a position as shown in Fig. 4, where said bell crank lever is stopped by spring tension. Such rotation of the lever 75 releases the sleeve 38, which previously was retained by the lever, and, therefore, forward movement of the tractor will result in moving the bar 20 forwardly to an extent limited by the diagonal slot 32 in which the pintle 30 slides. As the bar 20 moves forwardly the sleeve 38 of the pintle 30, riding in the slot 65, will serve to cam the leg 50 from its down or operative position, as seen in Fig. 5, into a retracted position, as seen in Figs. 2, 4 and in full lines in Fig. 3. At the same tension on the rope 78, reacting on lever 75 and pin 88, will rotate the latch bar 83 in a clockwise direction about its pivot 82, from the position shown in Fig. 5 to the position shown in Fig. 4. Upon release of the bell crank, tension of spring 87 will rotate latch 83 counter-clockwise to the position of Fig. 3, with its cam face 85 in engagement with the sleeve 38 of pintle 30.

Should the tractor be halted and it is desired to unhitch, the operator will pull on rope 78 while backing the tractor. The tension thus produced will rotate the bell crank 75 in a counter-clockwise direction, so that it will react against pin 88 thus moving the latch bar 83 in a clockwise direction to release bar 20. Then, rearward movement of the tractor will slide the bar 20 rearwardly relative to the channel 15, pintle 30 sliding through slots 32 and camming leg 50 into its downward or operative position. The tractor may then be unhitched and the drawbar will remain elevated, supported by the leg.

A bar 90 is secured adjacent the forward end of channel 15 so as to serve as a keeper for bar 20 when unhitched, as seen in Fig. 1, or dotted in Fig. 3.

A grease fitting 92 is provided for lubricating the bar 20 so that it will slide freely on the channel 15 under load.

It will be seen that I have provided an extremely convenient arrangement whereby the drawbar of a drawn vehicle or implement may be conveniently supported when not in use, so that it may be quickly hitched without undue effort on the part of the operator from the tractor seat. Manipulation of the supporting leg from operative to retracted position is simple and almost effortless. At the same time, the device may be made in extremely rugged form suitable for agricultural needs at moderate expense.

Various changes coming within the spirit of my invention will doubtless suggest themselves to those skilled in the art and, hence, I do not wish to be limited to the specific form shown or uses mentioned, except to the extent indicated by the appended claims.

I claim:

1. In combination with a drawbar comprising an element to be carried by an implement and an element having a free end for attachment to a source of locomotion, said second element being permanently connected at its other end to the first element by a longitudinal closed guideway and transverse pin connection permitting limited longitudinal movement of the second element relative to the first element, and a leg for supporting the drawbar, said leg having a lost motion connection to said second member, and manually operable means for latching and unlatching the leg in operative and retracted positions.

2. A combination as defined in claim 1, wherein said latching means comprises a pair of pivoted members one of which latches the leg in retracted position and the other of which latches the leg in operative position, one of the latch members having flexible remote control means, and means on one of the latch members engageable by the other of the latch members whereby actuation by the remote control means of one latch member will disengage the other latch member from latching position.

3. A combination as defined in claim 2 wherein resilient means is provided normally urging said pivoted members toward latching position.

4. A combination as defined in claim 1 wherein said latching means comprises a pair of pivoted members rotatably mounted on longitudinally spaced pivots on the first element and extending from said pivots toward each other, one of which latch members latches the leg in operative position and the other of which latches the leg in retracted position, together with a manually operable remote control member acting upon one of said pivoted members, and means whereby upon rotation the latter will act upon and release the other of said pivoted members from latching position.

5. A combination as defined in claim 1, wherein said latching means comprises a pair of pivoted members extending downwardly toward each other from their pivots, each latch member having an end formed to releasably latch said leg, one in drawbar supporting position and the other in retracted position, and means whereby rotating of one of said pivoted members will release the other pivoted member from latching position.

6. A combination as defined in claim 1 wherein said latching means comprises a pair of members carried by the first element on longitudinally spaced pivots, said latch members extending downwardly toward each other and being alternatively lockingly engageable with said second element in different positions of longitudinal adjustment of the latter, and resilient means connecting said latch members urging them into latching position.

7. In a combination as defined in claim 6, means on one of the latch members engageable by the other of said latch members whereby rotation of one latch member away from latching position will rotate the other latch member out of latching position.

8. In combination with a drawbar comprising an element to be carried by an implement and an element for attachment to a source of locomotion, said elements being relatively longitudinally slideable and telescopic, a transverse member carried by the last mentioned element, an enclosed trackway on the first element in which said transverse element is slideable, whereby said longitudinal sliding movement is limited, a leg pivoted to said first element for supporting the drawbar when idle, said leg having an elongated passage slidably engageable with said transverse element whereby the leg may be cammed by the longitudinal movement of said second element with lost motion from retracted to drawbar supporting position, and vice versa, and latching means pivotally secured to the first element for retaining the leg alternatively in retracted and in drawbar supporting position, said latching means being detachably engageable with said transverse element.

9. A combination as defined in claim 8, wherein said latching means comprises a pair of pivoted members, a resilient member interconnecting said pivoted members, whereby the latter are normally urged into latching position, and means whereby rotation of one of said pivoted members will move the other pivoted member out of latching position.

10. A combination as defined in claim 8 wherein the latching means comprises a pair of resiliently interconnected members secured on longitudinally spaced pivots above the drawbar, one of said members having a projection whereby rotation of one of the members will rotate the other out of operative position.

11. A combination as defined in claim 8 wherein said guides comprise elongated closed slots formed in opposite walls of the first element.

12. A combination as defined in claim 11 wherein the latching means comprises a pair of resiliently interconnected members secured on longitudinally spaced pivots above the drawbar, one of said members having a projection whereby rotation of one of the members will rotate the other out of operative position.

STANLEY E. HILL.

REFERENCES CITED

The following references are of record in the file of this patent:

UNITED STATES PATENTS

| Number | Name | Date |
|---|---|---|
| 2,225,157 | Court | Dec. 17, 1940 |
| 2,256,310 | Braley et al. | Sept. 16, 1941 |
| 2,388,923 | Masters | Nov. 13, 1945 |
| 2,400,145 | Zink et al. | May 14, 1946 |